United States Patent
Gupta (10) Patent No.: US 10,423,520 B2
(45) Date of Patent: Sep. 24, 2019

(54) METHOD AND SYSTEM FOR REAL-TIME IDENTIFICATION OF ANOMALOUS BEHAVIOR IN A SOFTWARE PROGRAM

(71) Applicant: Webomates LLC, Wilmington, DE (US)

(72) Inventor: Ruchika Gupta, Norwalk, CT (US)

(73) Assignee: Webomates LLC, Wilmington, DE (US)

( * ) Notice: Subject to any disclaimer, the term of this patent is extended or adjusted under 35 U.S.C. 154(b) by 155 days.

(21) Appl. No.: 15/438,762

(22) Filed: Feb. 22, 2017

(65) Prior Publication Data
US 2018/0239688 A1 Aug. 23, 2018

(51) Int. Cl.
| | | |
|---|---|---|
| G06F 9/44 | (2018.01) | |
| G06F 11/36 | (2006.01) | |
| G06F 8/60 | (2018.01) | |
| G06F 11/32 | (2006.01) | |
| G06F 11/34 | (2006.01) | |

(52) U.S. Cl.
CPC ...... *G06F 11/3684* (2013.01); *G06F 11/3692* (2013.01); *G06F 8/60* (2013.01); *G06F 11/323* (2013.01); *G06F 11/3466* (2013.01); *G06F 11/362* (2013.01); *G06F 11/3604* (2013.01); *G06F 11/3636* (2013.01); *G06F 11/3664* (2013.01); *G06F 11/3672* (2013.01)

(58) Field of Classification Search
CPC ............. G06F 11/3636; G06F 11/3664; G06F 11/3684; G06F 11/3672; G06F 2201/865; G06F 11/362; G06F 11/3604; G06F 11/323; G06F 8/60
See application file for complete search history.

(56) References Cited

U.S. PATENT DOCUMENTS

| | | |
|---|---|---|
| 6,961,873 B2 | 11/2005 | Dubovsky |
| 7,490,319 B2 | 2/2009 | Blackwell et al. |

(Continued)

OTHER PUBLICATIONS

Saeed Ghanbari et al., Stag-Aware Anomaly Dectection through Tracking Log Points, ACM, 2014, retrieved online on May 21, 2019, pp. 1-12. Retrieved from the Internet: <URL: http://www.eecg.toronto.edu/~amza/papers/2014-1.pdf>. (Year: 2014).*

(Continued)

*Primary Examiner* — Hanh Thi-Minh Bui
(74) *Attorney, Agent, or Firm* — HM Law Group LLP; Vani Moodley, Esq.

(57) ABSTRACT

Disclosed is a system and method for real-time identification of anomalous behavior in a software program. The system is configured to generate a set of signatures files corresponding to a set of test cases. In one embodiment, each signature file is configured to maintain trace data generated after running the one or more test cases on the software program in a staging environment. Further, the system may capture real-time trace data from the software program, wherein the software program is deployed in a production environment. Further, the system may analyze the real-time trace data to identify a subset of signature files, from the set of signature files, applicable to the real-time trace data. Further, the system may compare the real-time trace data with the sub set of signature files to identify anomalous behavior in the software program.

13 Claims, 3 Drawing Sheets

(56) References Cited

U.S. PATENT DOCUMENTS

| | | | |
|---|---|---|---|
| 7,954,091 B2 | 5/2011 | Li et al. | |
| 8,904,238 B2 | 12/2014 | Chan et al. | |
| 9,195,829 B1* | 11/2015 | Goradia | G06F 11/3604 |
| 9,934,378 B1* | 4/2018 | Hotta | G06F 16/9535 |
| 2008/0172580 A1* | 7/2008 | Davia | G06F 11/3676 |
| | | | 714/38.14 |
| 2011/0060569 A1* | 3/2011 | Lynn | G06F 11/0739 |
| | | | 703/6 |
| 2012/0124363 A1* | 5/2012 | Dietrich | G06F 11/3442 |
| | | | 713/100 |
| 2015/0254161 A1* | 9/2015 | Baril | G06F 11/3616 |
| | | | 717/124 |
| 2016/0162386 A1* | 6/2016 | Sivanesan | G06F 11/3672 |
| | | | 717/124 |

OTHER PUBLICATIONS

James H. Andrews, "Testing using log file analysis: tools, methods, and issues", 1998.

* cited by examiner

METHOD AND SYSTEM FOR REAL-TIME IDENTIFICATION OF ANOMALOUS BEHAVIOR IN A SOFTWARE PROGRAM

PRIORITY INFORMATION

This patent application does not claim priority from any application.

TECHNICAL FIELD

The present subject matter described herein, in general, relates to the field of software testing, and more particularly to a system and method for real-time identification of anomalous behavior in a software program.

BACKGROUND

One of the biggest challenges that have been observed in the field of software testing is to ensure quality of a software program/software product. In the production environment, the testing team and the development team work together for developing and testing the software product using a set of test cases. However, after the software product has been deployed in a production environment there may be different environmental changes introduced in the software product. The changes may be due to underlying platform/production environment on which the software product is deployed or due to the software update and addition of new functionalities to the software product once it is deployed. The changes in the software product may lead to introduction of bugs/anomalous behavior of the software product.

One way to ensure the quality of the software product is to conduct periodic testing of the software product, to identify bugs and performance issues, once the software product is deployed in the production environment. For the purpose of testing the software product in the production environment, the set of test cases, also referred to as test suite, designed by the testing team in the production environment is used. A test suite may contain hundreds of test cases configured to test different functionalities and Graphical User Interface (GUI) of the software product.

However, it is not always possible to test the software product using the entire set of test cases of the test suite once the software product is deployed in the production environment. One way out is to identify a subset of test cases, from the test suite, for testing the software product deployed in the production environment. However, there is no standard mechanism for identifying which test cases from the test suite are applicable in order to test the software product in the production environment.

SUMMARY

Before the present systems and methods, are described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to systems and methods for real-time identification of anomalous behavior in a software program and the concepts are further described below in the detailed description. This summary is not intended to identify essential features of the claimed subject matter nor is it intended for use in determining or limiting the scope of the claimed subject matter.

In one implementation, a system for real-time identification of anomalous behavior in a software program is disclosed. The system may comprise a processor and a memory coupled to the processor. The processor may execute program instructions stored in the memory. The processor may execute program instructions stored in the memory for generating a set of signatures files corresponding to a set of test cases. Each signature file may correspond to one or more test cases from the set of test cases. In one embodiment, each signature file is configured to maintain trace data generated after running the one or more test cases on the software program in a staging environment. Further, the processor may execute program instructions stored in the memory for capturing real-time trace data from the software program, wherein the software program is deployed in a production environment. Further, the processor may execute program instructions stored in the memory for analyzing the real-time trace data to identify a subset of signature files, from the set of signature files, applicable to the real-time trace data. Further, the processor may execute program instructions stored in the memory for comparing the real-time trace data with the sub set of signature files to identify anomalous behavior in the software program.

In another implementation, a method for real-time identification of anomalous behavior in a software program is disclosed. The method may comprise generating a set of signatures files corresponding to a set of test cases. Each signature file may correspond to one or more test cases from the set of test cases. In one embodiment, each signature file is configured to maintain trace data generated after running the one or more test cases on the software program in a staging environment. The method may further comprise capturing real-time trace data from the software program, wherein the software program is deployed in a production environment. The method may further comprise analyzing the real-time trace data to identify a subset of signature files, from the set of signature files, applicable to the real-time trace data. The method may further comprise comparing the real-time trace data with the sub set of signature files to identify anomalous behavior in the software program.

In yet another implementation, non-transitory computer readable medium embodying a program executable in a computing device for real-time identification of anomalous behavior in a software program is disclosed. The program may comprise a program code for generating a set of signatures files corresponding to a set of test cases. Each signature file may correspond to one or more test cases from the set of test cases. In one embodiment, each signature file is configured to maintain trace data generated after running the one or more test cases on the software program in a staging environment. The program may further comprise a program code for capturing real-time trace data from the software program, wherein the software program is deployed in a production environment. The program may further comprise a program code for analyzing the real-time trace data to identify a subset of signature files, from the set of signature files, applicable to the real-time trace data. The program may further comprise a program code for comparing the real-time trace data with the sub set of signature files to identify anomalous behavior in the software program.

BRIEF DESCRIPTION OF THE DRAWINGS

The foregoing detailed description of embodiments is better understood when read in conjunction with the appended drawings. For the purpose of illustrating the disclosure, example constructions of the disclosure is shown in the present document; however, the disclosure is not limited to the specific methods and apparatus disclosed in the document and the drawings.

The detailed description is given with reference to the accompanying figures. In the figures, the left-most digit(s) of a reference number identifies the figure in which the reference number first appears. The same numbers are used throughout the drawings to refer like features and components.

DETAILED DESCRIPTION

Some embodiments of this disclosure, illustrating all its features, will now be discussed in detail. The words "generating," "capturing," "analyzing," and "comparing," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the exemplary, systems and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

In one embodiment, a system for real-time identification of anomalous behavior in a software program is disclosed. The system may be configured to interact with a software program implemented in a staging environment and generate a set of signatures files corresponding to a set of test cases. Each signature file may correspond to one or more test cases from the set of test cases. In one embodiment, each signature file is configured to maintain trace data generated after running the one or more test cases on the software program in the staging environment.

In one embodiment, once the software program is implemented in the production environment, the system is configured to capture real-time trace data from the software program. Further, the system is configured to analyze the real-time trace data to identify a subset of signature files, from the set of signature files, applicable to the real-time trace data. Once the sub set of signature files is identified, in the next step, the system is configured to compare the real-time trace data with the sub set of signature files to identify anomalous behavior in the software program.

While aspects of described system and method for real-time identification of anomalous behavior in a software program and may be implemented in any number of different computing systems, environments, and/or configurations, the embodiments are described in the context of the following exemplary system.

Figure 1:
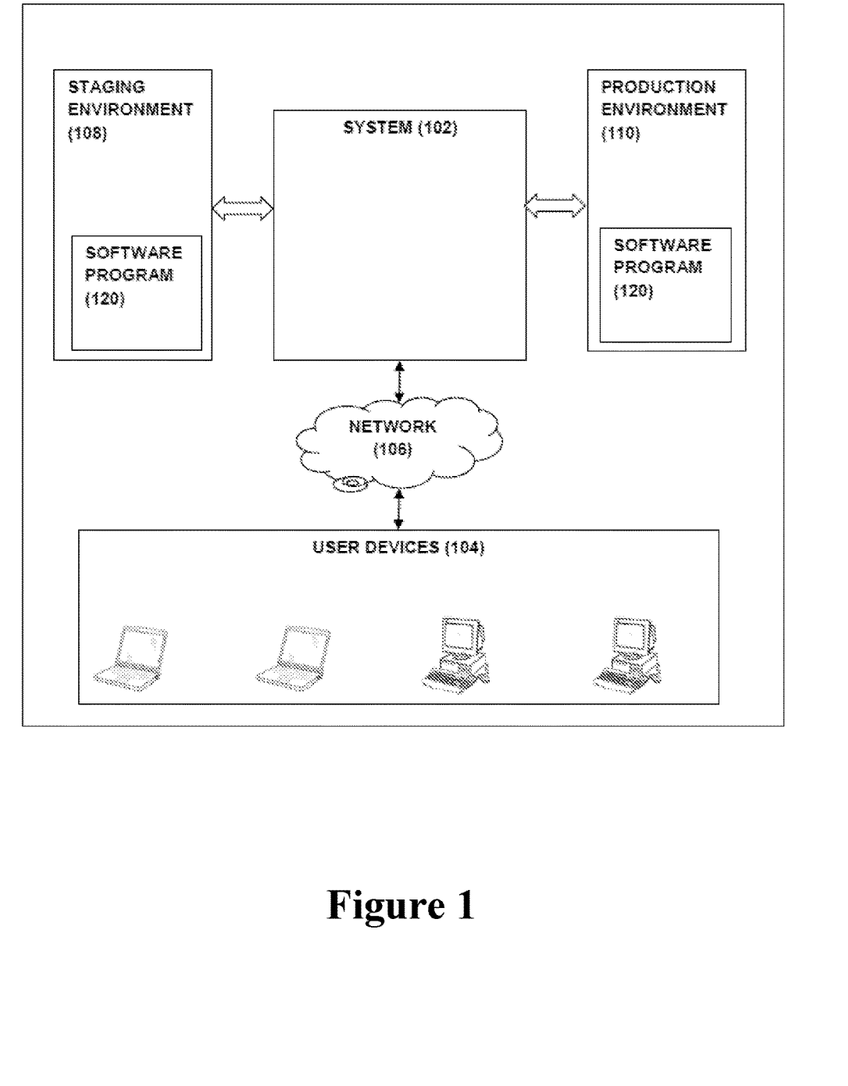
FIG. 1 illustrates a network implementation of a system for real-time identification of anomalous behavior in a software program, in accordance with an embodiment of the present subject matter.

Referring now to FIG. 1, a network implementation 100 of a system 102 for real-time identification of anomalous behavior in a software program is disclosed. The system 102 is connected to a staging environment 108 and a production environment 110. The staging environment 108 is a platform which enables users (software developers and testers) of the system 102 to develop and test a software program 120. Once the software program 120 is developed, the staging environment 108 enables the testing team to develop a set of test cases for testing the software program 120. Further, the set of test cases is also used in order to develop a set of signature file, wherein each signature file is associated with one or more test cases form the set of test cases. In one embodiment, each signature file is configured to maintain trace data generated after execution of one or more test cases on the software program 120 in the staging environment 108. In one aspect, once the set of signature files is developed, the system 102 is configured to maintain the set of signature files at a database. Further, the system 102 is configured to monitor trace data generated by the software program 120, once the software program is deployed over the production environment 110. This trace data is then compared by the system 102 with a subset of signature file in order to identify anomalous behavior of the software program 120.

Although the present disclosure is explained considering that the system 102 is implemented on a server, it may be understood that the system 102 may be implemented in a variety of computing systems, such as a laptop computer, a desktop computer, a notebook, a workstation, a mainframe computer, a server, a network server, a cloud-based computing environment. It will be understood that the system 102 may be accessed by multiple users through one or more user devices 104-1, 104-2 . . . 104-N, collectively referred to as user 104 or stakeholders, hereinafter, or applications residing on the user devices 104. In one implementation, the system 102 may comprise the cloud-based computing environment in which a user may operate individual computing systems configured to execute remotely located applications. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
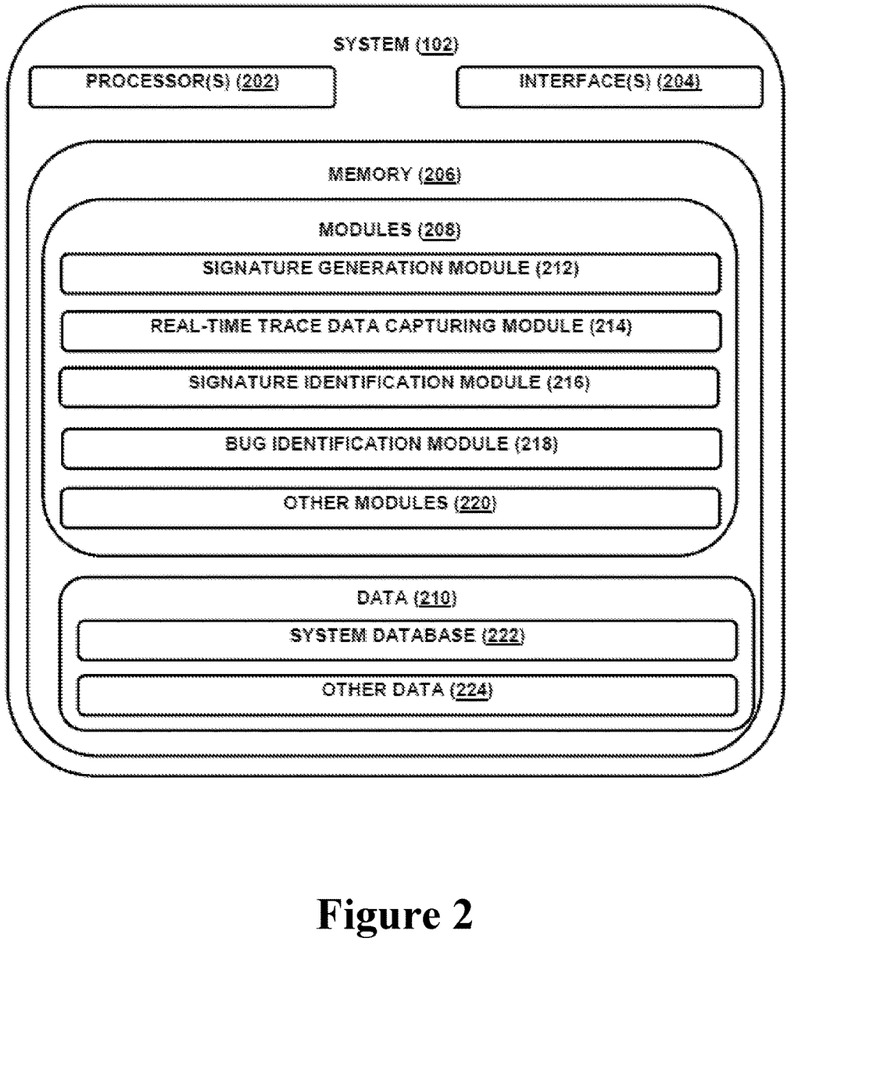
FIG. 2 illustrates the system, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a signature generation module 212, a real-time trace data capturing module 214, a signature identification module 216, a bug detection module 218, and other modules 220. The other modules 220 may include programs or coded instructions that supplement applications and functions of the system 102. The modules 208 described herein may be implemented as software modules that may be executed in the cloud-based computing environment of the system 102.

The data 210, amongst other things, serves as a repository for storing data processed, received, and generated by one or more of the modules 208. The data 210 may also include a system database 222 and other data 224. The other data 224 may include data generated as a result of the execution of one or more modules in the other modules 220.

As there are various challenges observed in the existing art, the challenges necessitate the need to build the system 102 for real-time identification of anomalous behavior in a software program 120. In one embodiment, the software program 120 may correspond to at least one of a web page, a software code, a software application, SAAS, PAAS, a mobile application, and alike. In one embodiment, the anomalous behavior may correspond to at least one of longevity bugs, performance bugs, security flaws, functional bugs, and alike.

In order to identify anomalous behavior in the software program 120, initially, the software program 120 may be deployed in the staging environment 108. Further, a user (hereinafter may also referred to as a software tester) may use the client device 104 to access the system 102 via the I/O interface 204. The user may register them using the I/O interface 204 in order to use the system 102. The system 102 may employ the signature generation module 212, the real-time trace data capturing module 214, the signature identification module 216, and the bug detection module 218. The detail functioning of the modules is described below with the help of figures.

In one embodiment, the signature generation module 212 enables the user (software tester) to access the software program 120 deployed at the staging environment 108. The signature generation module 212 further enables the user to generate a set of test cases for testing the functional and non functional requirements of the software program 120. In one embodiment, one or more test cases from the set of test cases may correspond to a use case associated with the software program 120. In one embodiment, each test case from the set of test cases is configured to test a plurality of lines of code of the software program 120 deployed in the staging environment 108. In one embodiment, the one or more test cases may be configured to test a feature, a module, or a web page associated with the software program for identifying anomalous behavior in the software program at the staging environment 108.

Further, the signature generation module 212 enables capturing trace data generated after running the one or more test cases, from the set of test cases, on the software program 120 deployed at the staging environment 108. The trace data may correspond to system and application log data, system and application log count, system resources count, network traffic, and logs generated from system resources including memory, CPU, file handle, socket handle, and running process associated with the software program 120 implemented in the staging environment 108. Once the trace data corresponding to the one or more test cases is generated, the signature generation module 212 enables storing the trace data in a separate log file, there by generating a signature file corresponding to the one or more test cases. In a similar manner, a set of signature files, corresponding to the set of test cases, is generated by the signature generation module 212 in the staging environment 108. The set of signature files may be stored in the system database 222 of the system 102. The signature generation module 212 also maintains mapping information between the one or more test cases and each of the signature file in the system database 222. This mapping information is used to identify a signature file corresponding to one or more test cases.

In one embodiment, once set of signature files are generated and stored in the system database 222, the software program 120 may be deployed in the production environment 110. Further, the real-time trace data capturing module 214 is configured to capture real-time trace data from the software program 120 deployed in the production environment 110. The real-time trace data may correspond to a system and application log, a system and application log count, system resources count, network traffic, and logs generated from system resources including memory, CPU, file handle, socket handle, and running process associated with the software program 120 implemented in the production environment 110. In one embodiment, the real-time trace data may be captured in a log file. The real-time trace data may correspond to at least one use case associated with the software program 120. In one example, the use case may be logging into the software program 120, downloading reports, uploading documents, displaying information, and alike. For each of the use cases, one or more test cases from the set of test cases may be associated therewith. In one embodiment, the real-time trace data may correspond to at least one use case.

Further, the signature identification module 216 is configured to analyze the real-time trace data to identify a subset of signature files, from the set of signature files, applicable to the real-time trace data. In order to identify the subset of signature files, the signature identification module 216 may be configured to determine one or more use cases corresponding to the real-time trace data. Once the one or more use cases are identified, in the next step, the signature identification module 216 is configured to identify a subset of test cases from the set of test case that are applicable to the one or more use cases. Based on the subset of test cases, the sub set of signature file corresponding to the real-time trace data is identified from the set of signature files. In one embodiment, the subset of signature files may be identified based on the mapping information stored in the system database 222.

Further, the bug identification module 218 may compare the real-time trace data with the trace data stored in the sub set of signature files. If there is a mismatch between the real-time trace data and the trace data stored in the sub set of signature files, the bug identification module 218 identifies anomalous behavior in the software program 120. The anomalous behavior may correspond to at least one of longevity bugs, performance bugs, security flaws, functional bugs, and alike.

Figure 3:
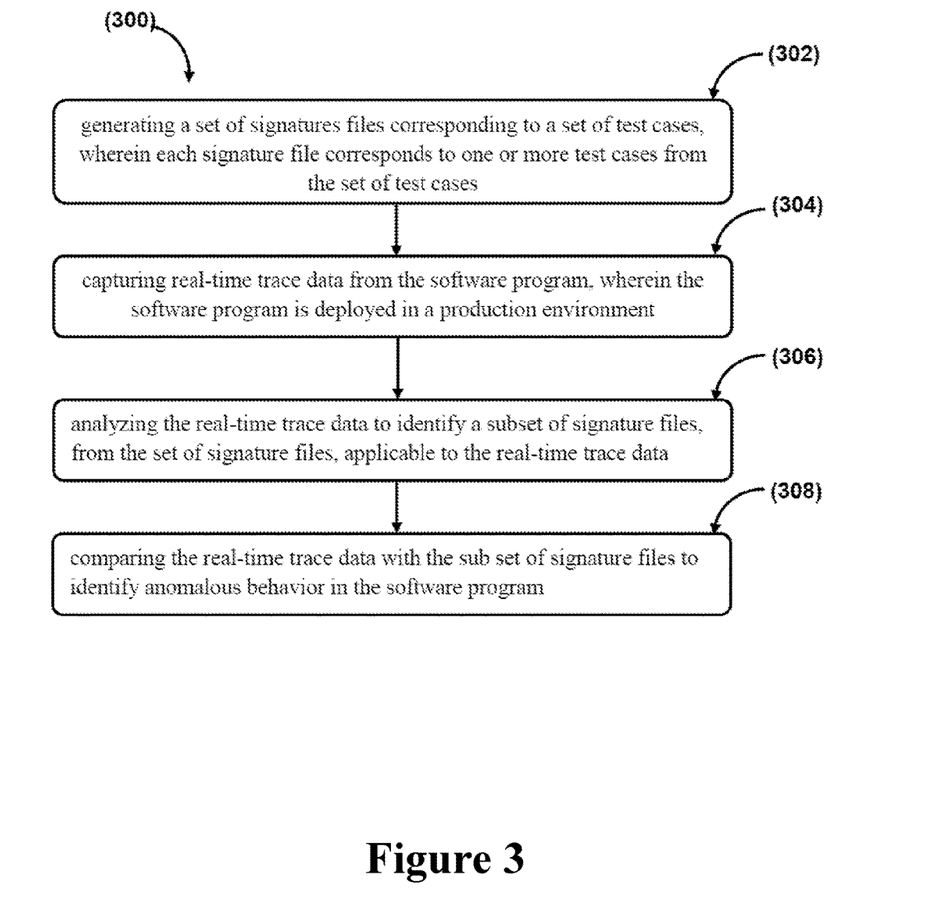
FIG. 3 illustrates a method for real-time identification of anomalous behavior in a software program, in accordance with an embodiment of the present subject matter.

Referring now to FIG. 3, a method 300 for real-time identification of anomalous behavior in a software program is shown, in accordance with an embodiment of the present subject matter. The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method can be implemented in any suitable hardware, software, firmware, or combination thereof. However, for ease of explanation, in the embodiments described below, the method 300 may be considered to be implemented as described in the system 102.

At block 302, the signature generation module 212 enables the user (software tester) to access the software program 120 deployed at the staging environment 108. The signature generation module 212 further enables the user to generate a set of test cases for testing the functional and non functional requirements of the software program 120. In one embodiment, one or more test cases from the set of test cases may correspond to a use case associated with the software program 120. In one embodiment, each test case from the set of test cases is configured to test a plurality of lines of code of the software program 120 deployed in the staging environment 108. In one embodiment, the one or more test cases may be configured to test a feature, a module, or a web page associated with the software program for identifying anomalous behavior in the software program at the staging environment 108.

Further, the signature generation module 212 enables capturing trace data generated after running the one or more test cases, from the set of test cases, on the software program 120 deployed at the staging environment 108. The trace data may correspond to system and application log data, system and application log count, system resources count, network traffic, and logs generated from system resources including memory, CPU, file handle, socket handle, and running process associated with the software program 120 implemented in the staging environment 108. Once the trace data corresponding to the one or more test cases is generated, the signature generation module 212 enables storing the trace data in a separate log file, there by generating a signature file corresponding to the one or more test cases. In a similar manner, a set of signature files, corresponding to the set of test cases, is generated by the signature generation module 212 in the staging environment 108. The set of signature files may be stored in the system database 222 of the system 102. The signature generation module 212 also maintains mapping information between the one or more test cases and each of the signature file in the system database 222. This mapping information is used to identify a signature file corresponding to one or more test cases.

At block 304, once set of signature files are generated and stored in the system database 222, the software program 120 may be deployed in the production environment 110. Further, the real-time trace data capturing module 214 is configured to capture real-time trace data from the software program 120 deployed in the production environment 110. The real-time trace data may correspond to a system and application log, a system and application log count, system resources count, network traffic, and logs generated from system resources including memory, CPU, file handle, socket handle, and running process associated with the software program 120 implemented in the production environment 110. In one embodiment, the real-time trace data may be captured in a log file. The real-time trace data may correspond to at least one use case associated with the software program 120. In one example, the use case may be logging into the software program 120, downloading reports, uploading documents, displaying information, and alike. For each of the use cases, one or more test cases from the set of test cases may be associated therewith. In one embodiment, the real-time trace data may correspond to at least one use case.

At block 306, the signature identification module 216 is configured to analyze the real-time trace data to identify a subset of signature files, from the set of signature files, applicable to the real-time trace data. In order to identify the subset of signature files, the signature identification module 216 may be configured to determine one or more use cases corresponding to the real-time trace data. Once the one or more use cases are identified, in the next step, the signature identification module 216 is configured to identify a subset of test cases from the set of test case that are applicable to the one or more use cases. Based on the subset of test cases, the sub set of signature file corresponding to the real-time trace data is identified from the set of signature files. In one embodiment, the subset of signature files may be identified based on the mapping information stored in the system database 222.

At block 308, the bug identification module 218 may compare the real-time trace data with the trace data stored in the sub set of signature files. If there is a mismatch between the real-time trace data and the trace data stored in the sub set of signature files, the bug identification module 218 identifies anomalous behavior in the software program 120. The anomalous behavior may correspond to at least one of longevity bugs, performance bugs, security flaws, functional bugs, and alike.

Although implementations for methods and systems for real-time identification of anomalous behavior in a software program have been described in language specific to structural features and/or methods, it is to be understood that the appended claims are not necessarily limited to the specific features or methods described. Rather, the specific features and methods are disclosed as examples of implementations for real-time identification of anomalous behavior in a software program.

The invention claimed is:

1. A system for real-time identification of anomalous behavior in a software program, the system comprising: a memory; and
   a processor coupled to the memory, wherein the processor is configured to execute program instructions stored in the memory for:
   generating a set of signatures files corresponding to a set of test cases for testing the functional and non functional requirements of the software program, wherein each signature file corresponds to one or more test cases from the set of test cases, wherein each signature file is configured to maintain trace data generated after running the one or more test cases on the software program in a staging environment, wherein the trace data comprises log data associated with the software program in the staging environment;
   capturing real-time trace data from the software program, wherein the software program is deployed in a production environment, wherein the real-time trace data comprises log data associated with the software program in the production environment;
   analyzing the real-time trace data to identify a subset of signature files, from the set of signature files, applicable to the real-time trace data, wherein the subset of signature files is identified by
      determining one or more use cases corresponding to the real-time trace data,
      identifying a subset of test cases from the set of test case that are applicable to the one or more use cases, and
      identifying the sub set of signature files corresponding to the real-time trace data based on the subset of test cases;
   comparing each signature file corresponding to the trace data with the sub set of signature files corresponding to the real-time trace data to identify anomalous behavior in the software program; and
   wherein the signature file corresponding to one or more test cases is identified from mapping information comprising mapping between the one or more test cases and each of the signature file.

2. The system of claim 1, wherein each signature file from the set of signature files is generated in the staging environment by:
   enabling a user to create a set of test cases, wherein each test case from the set of test cases is configured to test a plurality of lines of code of the software program,
   capturing trace data generated after running the one or more test cases, from the set of test cases, on the software program, and
   storing the trace data in a separate log file, there by generating a signature file corresponding to the one or more test cases.

3. The system of claim 1, wherein anomalous behavior corresponds to at least one of longevity bugs, performance bugs, security flaws, and functional bugs.

4. The system of claim 1, the software program corresponds to at least one of a web page, a software code, a software application, SAAS, PAAS, and mobile application.

5. The systems of claim 1, wherein the one or more test cases are configured to test a feature, a module, or a web page associated with the software program for identifying anomalous behavior in the software program.

6. The system of claim 1, wherein the trace data and the real-time trace data comprises at least one of a system and application log, a system and application log count, system resources count, network traffic, and logs generated from system resources including memory, CPU, file handle, socket handle, and running process associated with the software program.

7. A method for real-time identification of anomalous behavior in a software program, the method comprising steps of:
   generating, by a processor, a set of signatures files corresponding to a set of test cases for testing the functional and non functional requirements of the software program, wherein each signature file corresponds to one or more test cases from the set of test cases, wherein each signature file is configured to maintain trace data generated after running the one or more test cases on the software program in a staging environment, wherein the trace data comprises log data associated with the software program in the staging environment;
   capturing, by the processor, real-time trace data from the software program, wherein the software program is deployed in a production environment, wherein the real-time trace data comprises log data associated with the software program in the production environment;
   analyzing, by the processor, the real-time trace data to identify a subset of signature files, from the set of signature files, applicable to the real-time trace data, wherein the subset of signature files is identified by
      determining one or more use cases corresponding to the real-time trace data,
      identifying a subset of test cases from the set of test case that are applicable to the one or more use cases, and
      identifying the sub set of signature files corresponding to the real-time trace data based on the subset of test cases;
   comparing, by the processor, each signature file corresponding to the trace data with the sub set of signature files corresponding to the real-time trace data to identify anomalous behavior in the software program; and
   wherein the signature file corresponding to one or more test cases is identified from mapping information comprising mapping between the one or more test cases and each of the signature file.

8. The method of claim 7, wherein each signature file from the set of signature files is generated in the staging environment by:
   enabling a user to create a set of test cases, wherein each test case from the set of test cases is configured to test a plurality of lines of code of the software program, capturing trace data generated after running the one or more test cases, from the set of test cases, on the software program, and storing the trace data in a separate log file, there by generating a signature file corresponding to the one or more test cases.

9. The method of claim 7, wherein anomalous behavior corresponds to at least one of longevity bugs, performance bugs, security flaws, and functional bugs.

10. The method of claim 7, the software program corresponds to at least one of a web page, a software code, a software application, SAAS, PAAS, and mobile application.

11. The method of claim 7, wherein the one or more test cases are configured to test a feature, a module, or a web page associated with the software program for identifying anomalous behavior in the software program.

12. The method of claim 7, wherein the trace data and the real-time trace data comprises at least one of a system and application log, a system and application log count, system resources count, network traffic, and logs generated from system resources including memory, CPU, file handle, socket handle, and running process associated with the software program.

13. A non-transitory computer readable medium embodying a program executable in a computing device for real-time identification of anomalous behavior in a software program, the program comprising a program code:

a program code for generating a set of signatures files corresponding to a set of test cases for testing the functional and non functional requirements of the software program, wherein each signature file corresponds to one or more test cases from the set of test cases, wherein each signature file is configured to maintain trace data generated after running the one or more test cases on the software program in a staging environment, wherein the trace data comprises log data associated with the software program in the staging environment;

a program code for capturing real-time trace data from the software program, wherein the software program is deployed in a production environment, wherein the real-time trace data comprises log data associated with the software program in the production environment;

a program code for analyzing the real-time trace data to identify a subset of signature files, from the set of signature files, applicable to the real-time trace data, wherein the subset of signature files is identified by determining one or more use cases corresponding to the real-time trace data, identifying a subset of test cases from the set of test case that are applicable to the one or more use cases, and identifying the sub set of signature files corresponding to the real-time trace data based on the subset of test cases;

a program code for comparing each signature file corresponding to the trace data with the sub set of signature files corresponding to the real-time trace data to identify anomalous behavior in the software program; and wherein the signature file corresponding to one or more test cases is identified from mapping information comprising mapping between the one or more test cases and each of the signature file.

* * * * *